US012808555B2

(12) United States Patent
Schneider et al.

(10) Patent No.: US 12,808,555 B2
(45) Date of Patent: Nov. 24, 2026

(54) SYSTEMS AND METHODS TO CAPTURE WELDING FUMES

(71) Applicant: Illinois Tool Works Inc., Glenview, IL (US)

(72) Inventors: Joseph C. Schneider, Appleton, WI (US); Kevin Pagano, Algonquin, IL (US); Mitchell James Muske, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 497 days.

(21) Appl. No.: 18/112,821

(22) Filed: Feb. 22, 2023

(65) Prior Publication Data

US 2023/0266024 A1 Aug. 24, 2023

Related U.S. Application Data

(60) Provisional application No. 63/312,933, filed on Feb. 23, 2022.

(51) Int. Cl.

| | |
|---|---|
| ***F24F 7/10*** | (2006.01) |
| ***B08B 15/04*** | (2006.01) |
| ***B23K 9/10*** | (2006.01) |
| ***B23K 37/02*** | (2006.01) |
| ***F24F 8/10*** | (2021.01) |

(52) U.S. Cl.

CPC ................ *F24F 7/10* (2013.01); *B08B 15/04* (2013.01); *F24F 8/10* (2021.01); *B08B 2215/003* (2013.01); *B08B 2215/006* (2013.01); *B23K 9/1006* (2013.01); *B23K 37/0229* (2013.01)

(58) Field of Classification Search

CPC ................ F24F 7/10; F24F 8/10; B08B 15/04

USPC ...................................................... 454/49–67

See application file for complete search history.

(56) References Cited

U.S. PATENT DOCUMENTS

| | | | | |
|---|---|---|---|---|
| 6,620,038 B1 * | 9/2003 | Kikuchi | F24F 7/06 454/189 |
| 9,468,958 B2 * | 10/2016 | Hammers | B08B 15/002 |
| 10,137,485 B2 * | 11/2018 | Mate | B23Q 11/0046 |
| 2013/0084788 A1 * | 4/2013 | Tartaglia | F24F 7/00 454/49 |
| 2015/0004895 A1 * | 1/2015 | Hammers | B08B 15/02 454/49 |

FOREIGN PATENT DOCUMENTS

| | | |
|---|---|---|
| CN | 109014718 | 12/2018 |
| EP | 1895242 | 3/2008 |

OTHER PUBLICATIONS

European Office Communication with extended European Search Report Appln No. 23158243.8 dated Jul. 24, 2023.

* cited by examiner

*Primary Examiner* — Vivek K Shirsat

(74) *Attorney, Agent, or Firm* — McAndrews, Held & Malloy, Ltd.

(57) ABSTRACT

An example welding system includes: a downdraft table having: a work surface; and a suction source configured to create a negative pressure through at least one of the work surface or a second surface adjacent to the work surface; and a positive pressure source configured to direct a positive pressure airflow around at least a portion of a periphery of the downdraft table.

13 Claims, 9 Drawing Sheets

SYSTEMS AND METHODS TO CAPTURE WELDING FUMES

FIELD OF THE DISCLOSURE

This disclosure relates generally to welding and, more particularly, to systems and methods to capture welding fumes.

BACKGROUND

Fumes, such as fumes generated by manual or robotic welding operations, are undesirable when permitted to disperse into environments surrounding the welding operations and into which welding personnel may be present.

SUMMARY

Systems and methods to capture welding fumes are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
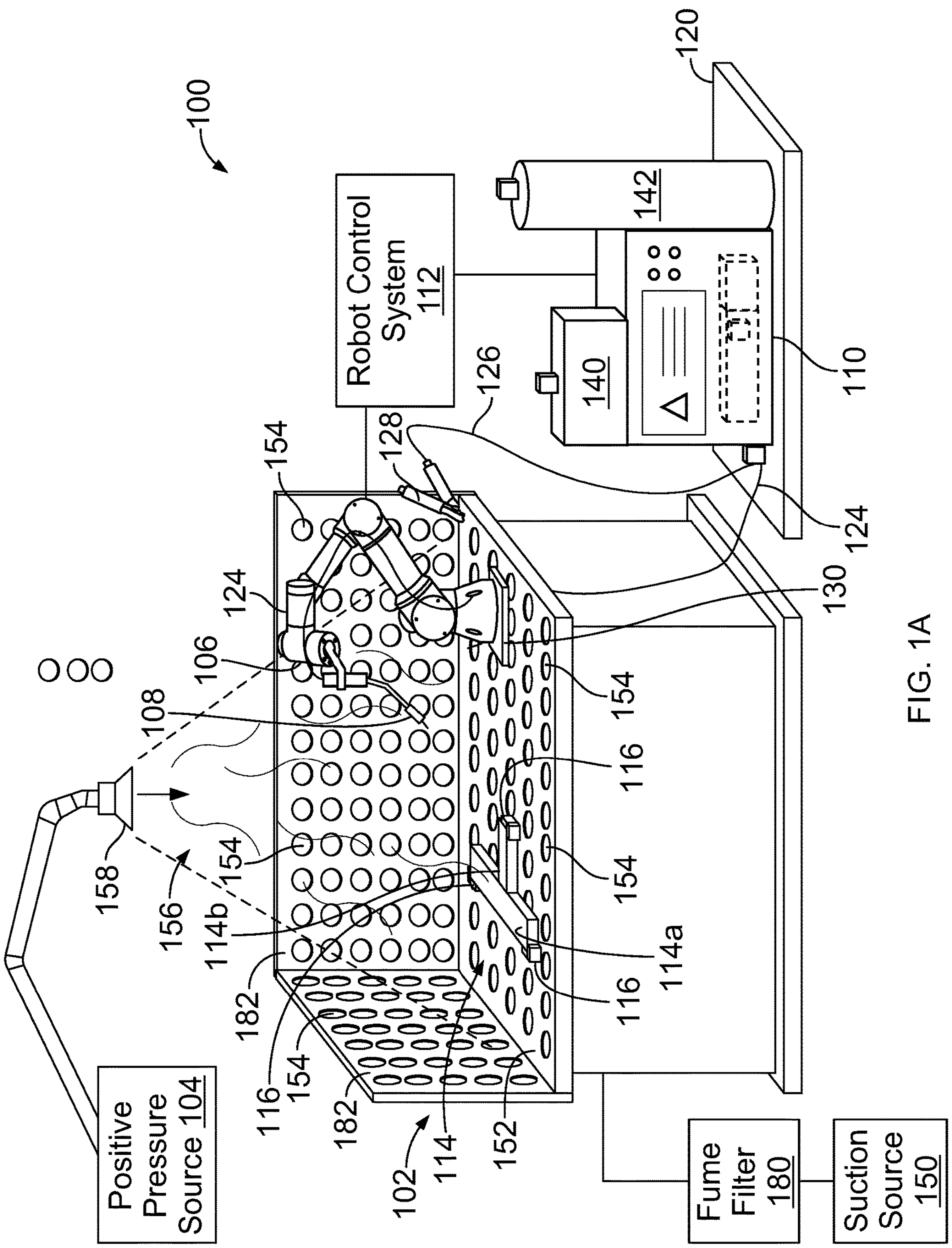
FIG. 1A illustrates an example robotic welding system to perform welding and to capture resulting welding fumes, including a downdraft table and a positive pressure source configured to create a cone-shaped positive pressure flow directed toward the downdraft table, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, a first object being "proximate" to a second object refers to a distance within which the first object (e.g., a device, a visual or audible notification) is associated with the second object to the exclusion of other objects of the same or similar type (e.g., close enough to be associated with one robotic welding system and not others).

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example welding systems include: a downdraft table having: a work surface; and a suction source configured to create a negative pressure through at least one of the work surface or a second surface adjacent to the work surface; and a positive pressure source configured to direct a positive pressure airflow around at least a portion of a periphery of the downdraft table.

In some example welding systems, the work surface includes a plurality of apertures, and the downdraft table is configured to direct fumes generated adjacent the work surface through the work surface to the suction source via the apertures. Some example welding systems further include one or more fixtures configured to be mounted or attached to the work surface via the apertures, in which the fixtures are configured to hold a workpiece in place on the work surface.

In some example welding systems, the positive pressure source includes or is coupled to a manifold configured to create at least one of an air knife or an air curtain positioned to block dispersion of fumes generated adjacent the work surface in at least one direction away from the downdraft table. In some example welding systems, the manifold is configured to create two or more air curtains or air curtains on two more sides of the downdraft table. In some example welding systems, the suction source is configured to draw air and fume via the at least one of the work surface or the second surface, filter the fume from the air, and expel filtered air via the manifold. In some example welding systems, the positive pressure source is positioned above the downdraft table and is configured to create the positive pressure airflow in a cone shape around the periphery of the work surface.

Some example welding systems further include a robotic manipulator coupled to the downdraft table and configured to manipulate a welding torch. Some example welding systems further include a welding-type power supply configured to supply welding-type power to the welding torch. Some example welding systems further include a robotic controller configured to control the robotic manipulator and the welding-type power supply to perform a robotic welding procedure on a workpiece positioned on the downdraft table. In some example welding systems, the robotic controller is configured to control the suction source.

In some example welding systems the positive pressure source is configured to entrain fumes generated adjacent the work surface between the positive pressure airflow and the work surface such that the fumes are drawn into the suction source. In some example welding systems, the second surface includes a lateral surface, and the downdraft table is configured to direct fumes generated adjacent the work surface through the lateral surface to the suction source.

FIG. 1A illustrates an example robotic welding system 100 to perform welding and to capture resulting welding fumes, including a downdraft table 102 and a positive pressure source 104 configured to create a cone-shaped positive pressure flow directed toward the downdraft table 102. The example robotic welding system 100 of FIG. 1A further includes a robotic manipulator 106 configured to manipulate a welding torch 108, a welding-type power supply 110, and a robot control system 112.

The downdraft table 102, robotic manipulator 106, the welding torch 108, the welding-type power supply 110, and/or the robot control system 112, and/or subgroups of these components, may be packaged together (e.g., pre-assembled, pre-calibrated) to provide rapid setup of the robotic welding system 100 for welding at the end-user location. The robotic welding system 100 may be used to make repetitive welds, to leverage the consistency and repeatability advantages of the robotic manipulator 106. In the example of FIG. 1A, the robotic manipulator 106 and/or the robot control system 112 are configured as a collaborative robot, which provides features that make the robotic manipulator 106 more conducive to working in areas in which people are proximate the robotic welding system 100.

In the example of FIG. 1A, a workpiece 114 is positioned on the downdraft table 102. The workpiece 114 may include multiple components 114*a*, 114*b* which are to be welded together at one or more joints. To provide consistency in arrangement of the workpiece components 114*a*, 114*b*, the robotic welding system 100 may further include fixtures 116 attached to the downdraft table 102. The fixtures 116 may guide the placement of the components 114*a*, 114*b*, which can be used to consistently place the multiple components 114*a*, 114*b*.

During a welding operation or welding procedure, the robotic welding system 100 manipulates the welding torch 108, such as the illustrated welding torch, to which power is delivered by the welding-type power supply 110 via a first conductor 124 and returned by way of a work cable 126 and a work clamp 128 coupled to the downdraft table 102. The welding equipment may further include, for example, a source of shielding gas 142, a wire feeder 140, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. Whereas conventional welding robots are contained within a weld cell that is protected against intrusion by operators during robot operations (e.g., welding operations and/or other movement by the robot), in some examples the robotic welding system 100 is configured as a cobot, has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque relative to conventional welding robots, and/or implement other features.

The robotic manipulator 106 is coupled to the downdraft table 102 via a base 130. Once secured, the base 130 is fixed with respect to the downdraft table 102, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140) and/or other robotic equipment.

The example downdraft table 102 is a welding table configured with a suction source 150 to create a negative pressure through a work surface 152 (e.g., via apertures 154 or holes) or other surface adjacent to the work area of the table 102, such that fume, dust, and/or other particulate is at least partially drawn from the work area through the work surface 152 or other surface via the negative pressure. Some or all of the apertures 154 may be structured such that they also serve as mounting points for securing the workpiece 114 and/or fixtures 116 to the table 102. In some examples, the apertures 154 may be configured to have different aperture configurations (e.g., different sizes, different shapes, different attachment methods, etc.) and/or may be provided with adapters to convert a first aperture configuration to a second aperture configuration. The work area includes the surfaces of the table 102 to which a workpiece 114 may be attached or otherwise secured for welding. In some examples, the fixtures 116 are also configured with apertures to enable the apertures 154 in which the fixtures 116 are attached to continue to capture fumes.

The example positive pressure source 104 of FIG. 1A is coupled to one or more manifolds (e.g., airflow emitters 158) positioned over the downdraft table 102, and generates a cone-shaped airflow 156 directed toward the downdraft table 102. In the example of FIG. 1A, the cone-shaped airflow 156 is positioned and shaped by one or more airflow emitters 158 to cover substantially the entire work surface 152 of the downdraft table 102 with the airflow, to improve entrainment of fumes generated by welding operations at the location of the workpiece 114. In some examples, the cone-shaped airflow 156 is further positioned and shaped to reduce or minimize portions of the airflow 156 that leak or flow beyond the edges of the work surface 152, such that the downdraft table 102 may increase (e.g., maximize) capture of the airflow created by the positive pressure source 104.

In the example of FIG. 1A, the flow volume in the cone-shaped airflow 156 matches or is slightly less than the flow volume captured by the downdraft table 102, to improve the proportion of fume capture and to reduce or eliminate turbulence and potential emission of fumes into the surrounding environment. In the example of FIG. 1A, the downdraft table 102, the suction source 150, the positive pressure source 104, and the airflow emitter 158 are arranged and configured to reduce flow velocity, to thereby reduce interference by the airflow 156 and fume capture with the shielding provided by shielding gas emitted by the welding torch 108 to shield the weld pool of the welding operation.

The robot control system 112 may communicate with the suction source 150 and/or the positive pressure source 104 to activate fume collection at times when welding is occurring (e.g., while fumes are being produced), as well as periods immediately before and/or immediately after welding. For example, building the airflow collection stream may require a period of time after activation of the suction source 150 and/or the positive pressure source 104. In other examples, the suction source 150 and/or the positive pressure source 104 may be operated manually, such that throughput is not reduced while waiting for the fume collection airflow streams are building.

Figure 1B:
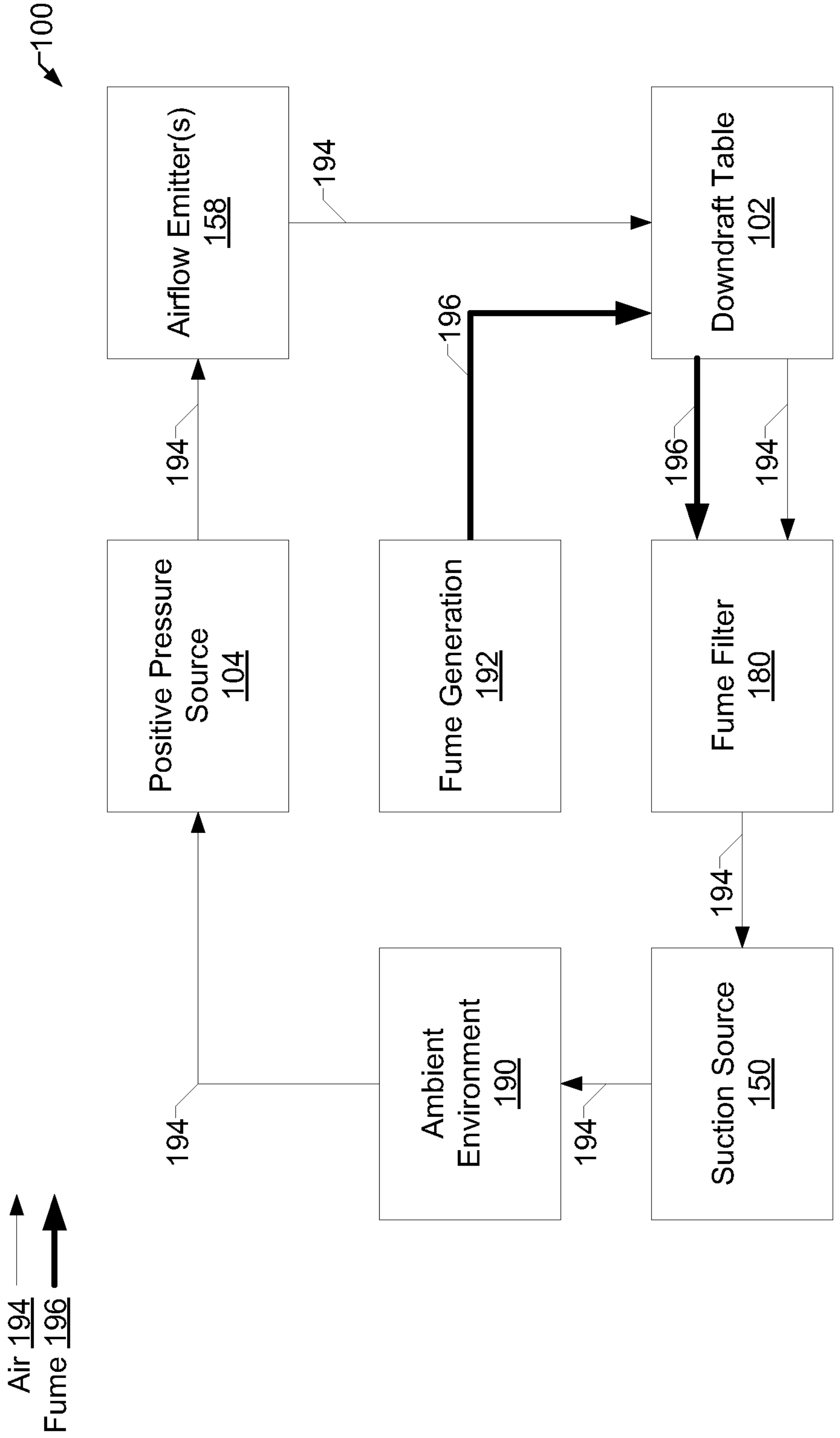
FIG. 1B is a block diagram illustrating the flows of the example robotic welding system of FIG. 1A.

FIG. 1B is a block diagram illustrating the flows of the example robotic welding system 100 of FIG. 1A. As illustrated in FIG. 1B, the suction source 150 ejects airflow 194 into the ambient environment 190 around the downdraft table 102, and the positive pressure source 104 draws airflow from the ambient environment. A fume generation source 192 (e.g., the robotic welding operations occurring on the downdraft table 102) generates fume 196, which is captured via the downdraft table 102, and routed to a fume filter 180 with the airflow 194, which may entrain the fume 196 for capture by the downdraft table 102. The fume filter 180 filters the fume 196 from the airflow 194 and passes the remaining airflow 194 to the suction source 150.

Figure 2A:
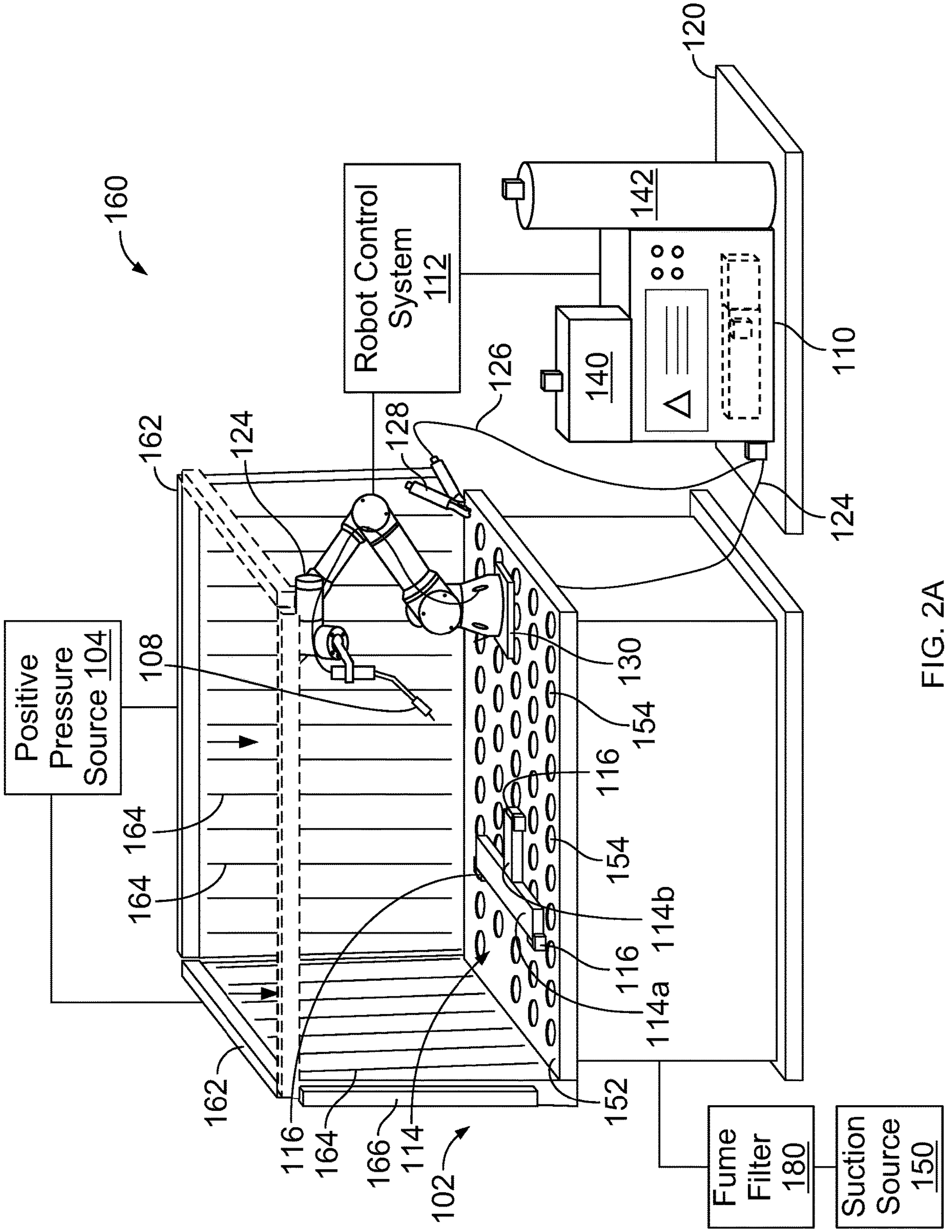
FIG. 2A illustrates an example robotic welding system to perform welding and to capture resulting welding fumes, including a downdraft table and one or more air curtains configured to provide a positive pressure source adjacent the downdraft table, in accordance with aspects of this disclosure.

FIG. 2A illustrates another example robotic welding system 160 to perform welding and to capture resulting welding fumes. The example system 160 includes the downdraft table 102 of FIG. 1A, and further includes one or more manifolds (e.g., air curtains 162) coupled to the positive pressure source 104 adjacent the downdraft table 102.

The example air curtains 162 are positioned and oriented such that positive pressure airflows 164 are created around at least a portion of the periphery of the work surface 152 of the downdraft table 102. The downdraft table 102 may draw a portion of the airflow 164, but also draws air from directly above the downdraft table 102 to create a fume capture airflow through the apertures 154.

The airflows 164 may be higher pressure and/or higher flow velocity than the airflow produced in the cone-shaped airflow 156 of FIG. 1A. Instead of entraining the fumes in an airflow produced by the positive pressure source 104, the example airflows 164 reduce or prevent dispersal of fumes into the environment through the airflows 164. As a result, the air curtains 162 keep the fumes adjacent the downdraft table 102, where the fumes are eventually drawn into the downdraft table 102.

Figure 2B:
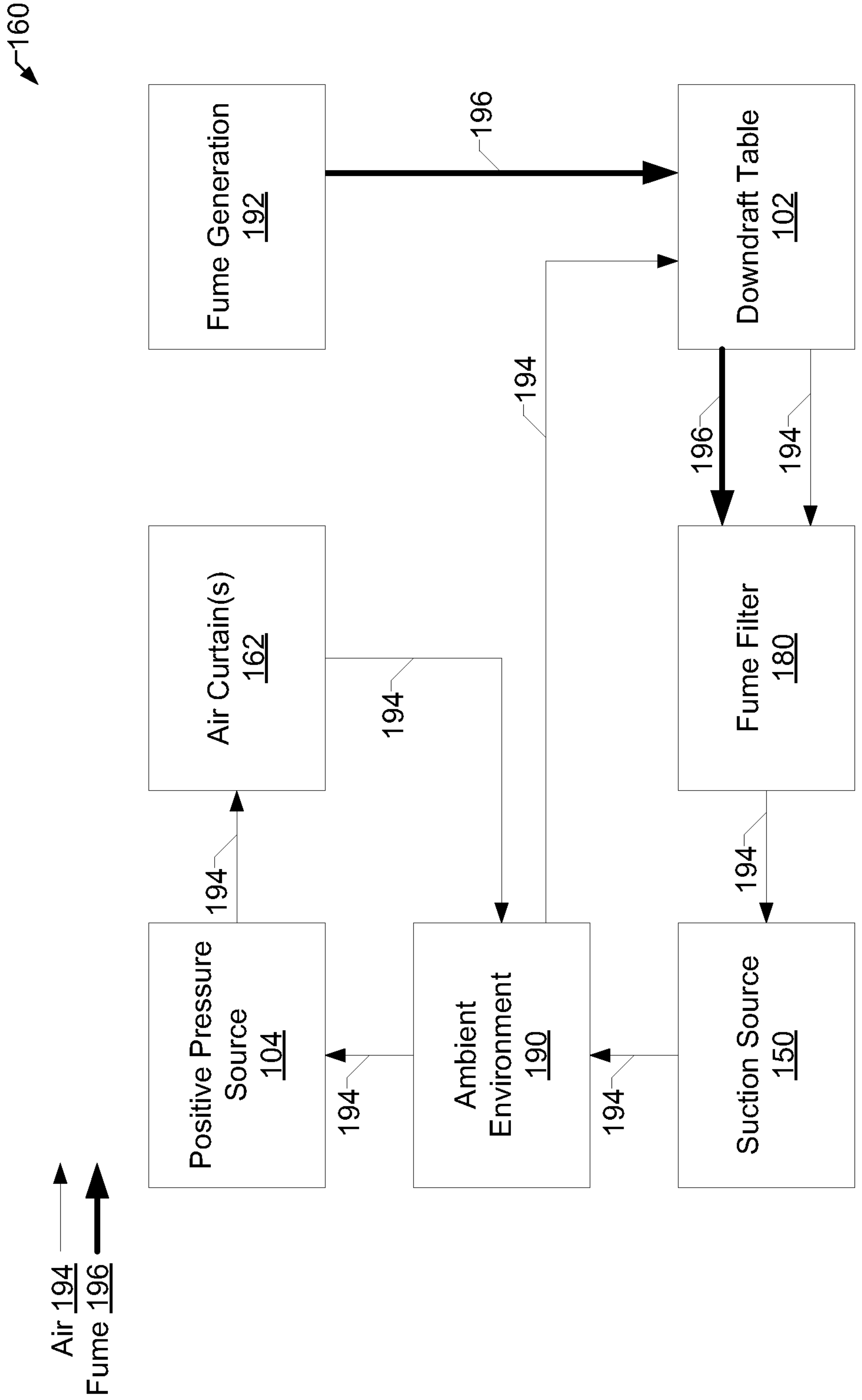
FIG. 2B is a block diagram illustrating the flows of the example robotic welding system of FIG. 2A.

FIG. 2B is a block diagram illustrating the flows of the example robotic welding system 160 of FIG. 2A. The flows of FIG. 2B are similar to the flows of FIG. 1B, except that the air curtains 162 eject the airflows 194 into the ambient environment 190 around the downdraft table 102 instead of directing the airflows 194 toward the downdraft table 102 for entrainment of the fume 196 and capture by the downdraft table 102. As a result, the downdraft table 102 captures airflow 194 from the ambient environment 190 to entrain the fume 196.

Figure 3A:
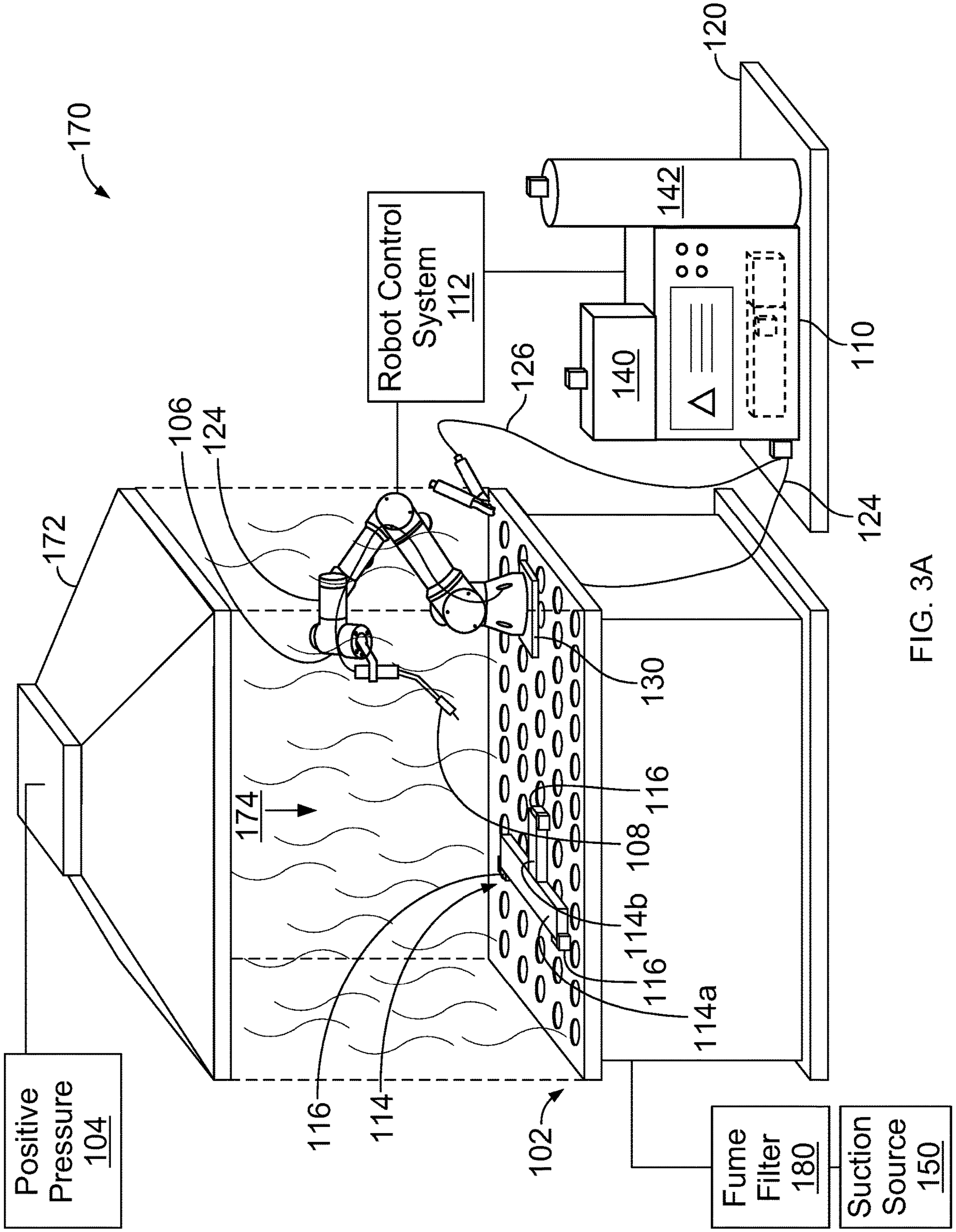
FIG. 3A illustrates an example robotic welding system to perform welding and to capture resulting welding fumes, including a downdraft table and a positive pressure source configured to provide an air current toward the downdraft table to entrain fumes, in accordance with aspects of this disclosure.

FIG. 3A illustrates another example robotic welding system 170 to perform welding and to capture resulting welding fumes, including the downdraft table 102 of FIG. 1A and the positive pressure source 104 coupled to a manifold (e.g., an air current hood 172) which is configured to provide an air current 174 toward the downdraft table 102 to entrain fumes.

Similar to the cone-shaped airflow 156 of FIG. 1A, the air current 174 has a low airflow velocity, and the air current 174 and the downdraft table 102 may be configured to conduct approximately the same volumes of air. However, in contrast with the cone-shaped airflow 156, the example air current 174 is structured to have substantially the same flow area as the work surface 152. The low airflow velocity in the air current 174 improves entrainment of fumes within the air current 174, which is directed at the work surface 152 of the downdraft table 102.

Figure 3B:
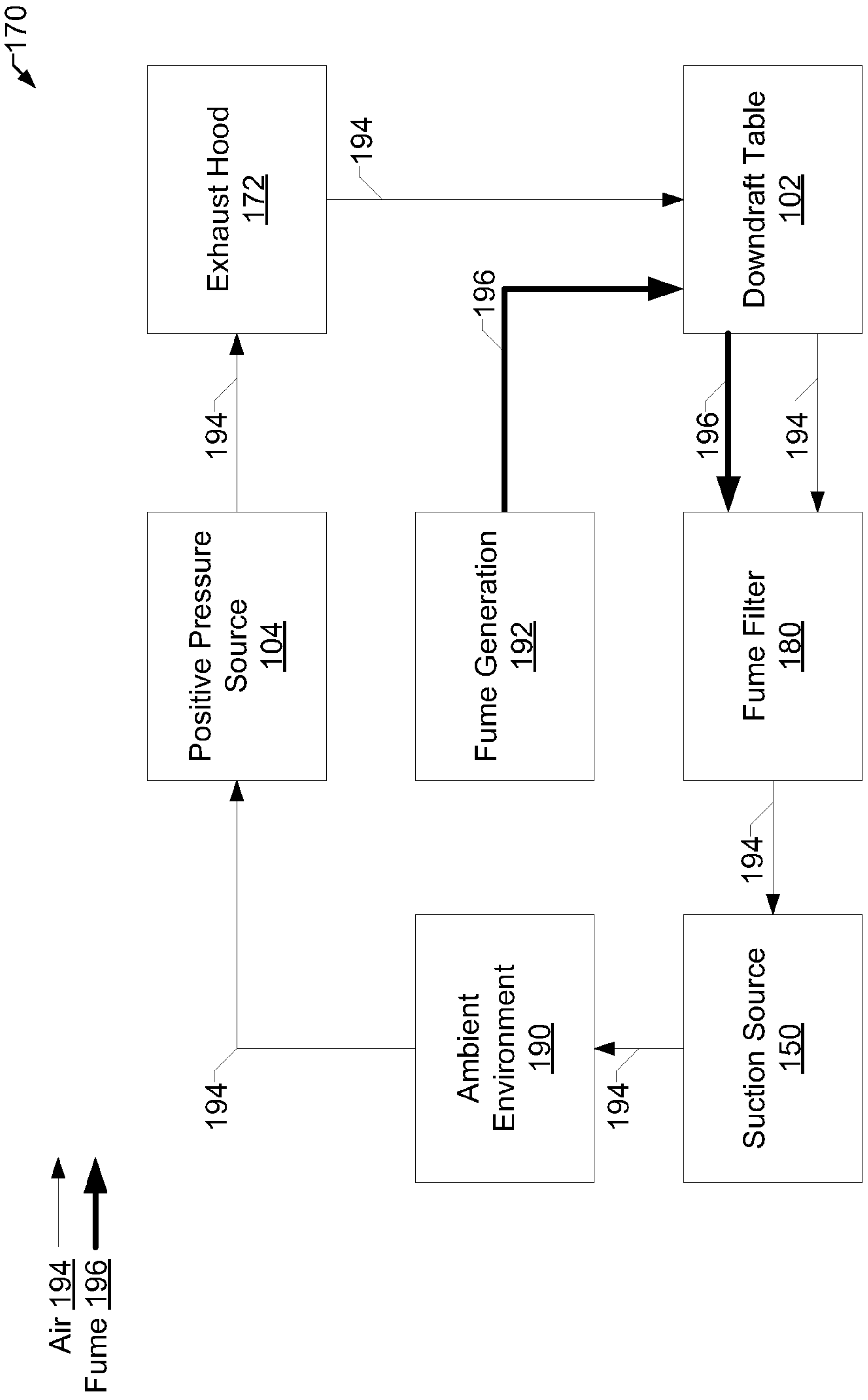
FIG. 3B is a block diagram illustrating the flows of the example robotic welding system of FIG. 3A.

FIG. 3B is a block diagram illustrating the flows of the example robotic welding system 160 of FIG. 3A. The flows of FIG. 3B are similar to the flows of FIG. 1B, except that the positive pressure source 104 provides the airflow 194 to the air current hood 172 for conduction toward the downdraft table 102, which entrains the fume 196 for capture by the downdraft table 102.

The block diagrams of FIGS. 1B, 2B, and 3B do not include pathways representing potential leakage of airflow 194 and/or fume 196 (e.g., into and/or out of the ambient environment 190). For example, if the positive pressure source 104 and the downdraft table 102 do not have equal quantities of airflow 194, a portion of the airflow 194 may flow into and/or be pulled from the ambient environment 190. In some examples, the suction source 150 is coupled to the positive pressure source 104 to conduct the airflow 194, bypassing the ambient environment 190.

Any of the example systems 100, 160, 170 of FIGS. 1A-3B may couple the suction source 150 to a fume filter 180. The fume filter 180 captures and settles fume from the air pulled through the downdraft table 102 for eventual disposal, and outputs filtered air to the suction source 150.

In some examples, the suction source 150 and the positive pressure source 104 may be combined into a single, open-loop or closed-loop airflow system, which may provide the airflow drawn via suction through the downdraft table 102 as positive pressure to generate a positive pressure airflow (e.g., via the airflow emitter 158, the air curtain(s) 162, or the air current hood 172) toward the downdraft table 102. In some examples, a bypass and/or one or more one-way valves may be provided between the suction source 150 and the positive pressure source 104 to allow operation of one of the suction source 150 and the positive pressure source 104 at a time, while also allowing for closed-loop operation of the suction source 150 together with the positive pressure source 104.

In some examples, the robotic welding system 160 is configured to turn off all or a portion of the airflows or air currents 156, 164, 174 (e.g., an arcuate section of the cone-shaped airflow 156, one or more of the air curtains 162, a portion of the air current 174) in response to detecting an object traversing the airflows 156, 164, 174. By turning off the airflows 156, 164, 174 when an object or other obstruction is present, the airflows 164 reduce or avoid the presence of turbulence adjacent the downdraft table 102 that could affect fume capture.

For example, the system 160 of FIG. 2A may include sensor(s) such as a light curtain 166 configured to detect whether an object is present in the airflow 164. The system 160 may include a light curtain 166 for each of the air curtains 162 to be monitored. In operation, the example robotic welding system 160 (e.g., via the robotic control system 112 (or other controller, such as the welding power supply 110, a programmable logic controller (PLC), or an external or remote computing system) controls the air curtains 162 to output the airflows 164 continuously (e.g., while the robotic welding system 160 is powered on) and/or beginning prior to a welding operation (e.g., with sufficient time to establish a consistent airflow). The robotic welding system 160 also controls the suction source 150 to provide suction through the downdraft table 102 in conjunction with the air curtains 162. The robotic welding system 160 controls the suction source 150 and the air curtains 162 until a period after the welding operations are complete. In some examples, the robotic welding system 160 controls the suction source 150 and the positive pressure source 104 separately, to begin and/or end the positive flow and the suction at different times to establish the desired airflow for fume capture.

If, during the operation of the air curtains 162, one or more of the light curtain 166 are triggered (e.g., by an operator reaching over the downdraft table 102), the robotic welding system 160 controls the corresponding ones of the air curtains 162 to turn off until the light curtain 166 determines that there is no longer an object present. When the object has been removed, the robotic welding system 160 controls the air curtains 162 to turn on again. In some examples, the light curtain 166 or other sensors may be interlocked with the air curtains 162, such that the light curtains 166 turn off the air curtains 162 in response to detection of an object, without involvement of the robotic welding system 160.

The example downdraft tables 102 of FIGS. 1A, 2A, and/or 3A may include one or more lateral surfaces 182 adjacent the work surface 152. The lateral surfaces 182 limit dispersion of fumes into the environment. In some examples, the lateral surfaces 182 further include apertures 154 fluidly coupled to the suction sources 150 to provide additional fume collection.

Any of the example systems disclosed herein may be modified to provide suction via the downdraft table and a positive pressure airflow to capture fumes from manual welding, in which a human weld operator performs the welding using manual welding equipment. In such examples, the robotic manipulator 106 may be replaced by a human operator welding the workpiece 114 using a manual welding torch instead of the welding torch 108.

Figure 4:
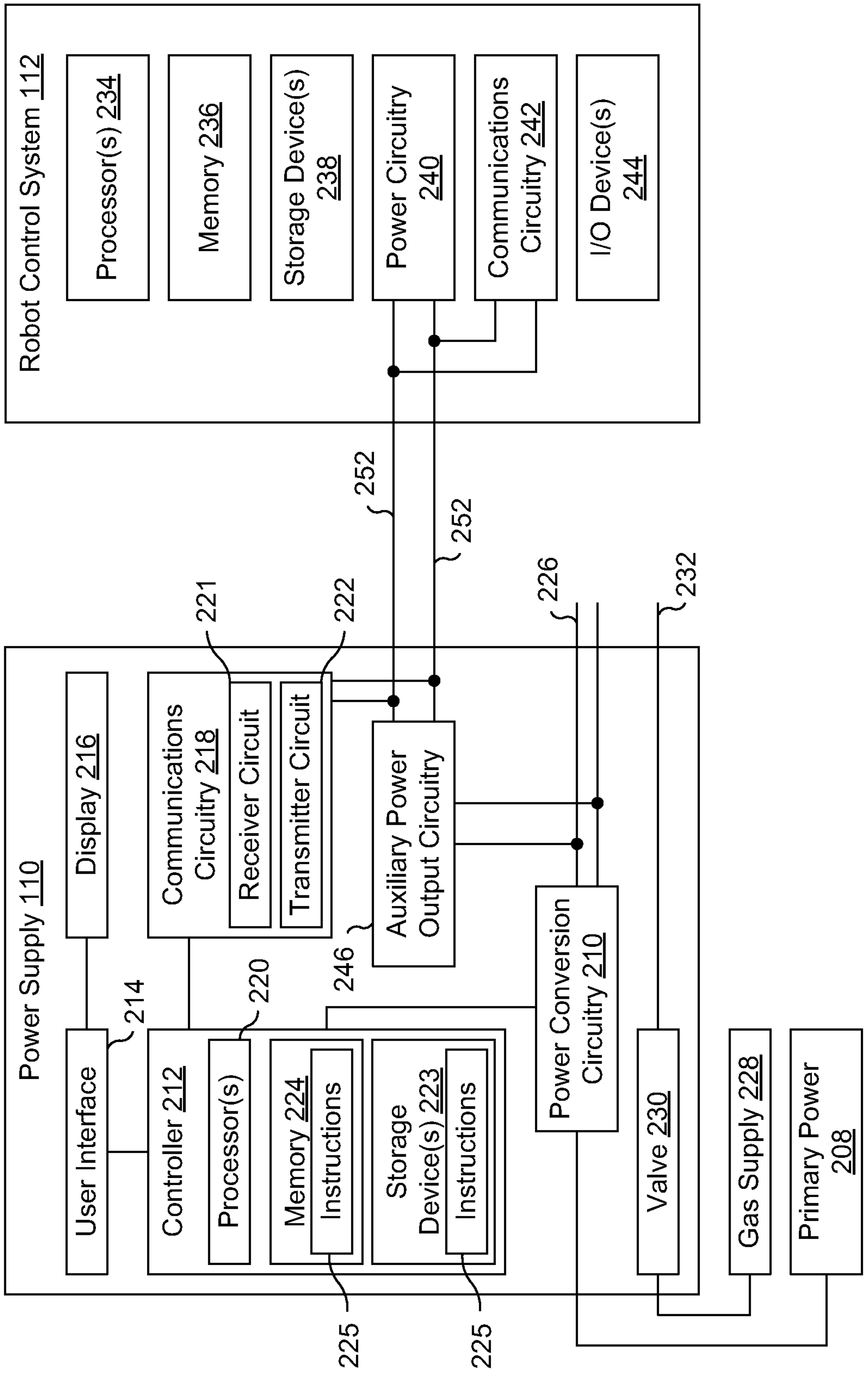
FIG. 4 is a block diagram of an example implementation of the welding-type power supply and the robot control system of FIGS. 1A-3A.

FIG. 4 is a block diagram of an example implementation of the welding-type power supply 110 and the robot control system 112 of FIG. 1A. The example welding-type power supply 110 powers, controls, and supplies consumables to a welding application. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes).

The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10baseT, 10base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder.

The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 4 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). In the example of FIG. 4, the robot control system 112 is plugged into welding-type power supply 110 to provide operational power to the robot control system 112 and/or the robotic manipulator 106. In the illustrated example, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In such examples, the robot control system 112 can be plugged into the power supply 110 instead of mains power, and receives the auxiliary power via an auxiliary power connection (e.g., auxiliary power conductors 252 such as an AC power cord).

The example communications circuitry 218 and the communications circuitry 242 of FIG. 4 are configured to communicate via the auxiliary power connection. In examples in which the auxiliary power conductors 252 are configured to transmit 120 VAC power (or other high-voltage AC power), the communications circuitry 218 and the communications circuitry 242 may be configured to comply with the IEEE Standard 1901-2010 and/or any other power line communication standard or technique compatible with high-speed communication over the auxiliary power connection.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multi-touch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106. In other examples, the communications circuitry 242 may also include a communication interface to communicate with and control the robotic manipulator 106.

The power supply 110 may be connected to the example robot control system 112 by plugging the robot control system 112 into the power supply 110 via the auxiliary power connection (e.g., a 120 VAC outlet on the power supply). While the power supply 110 is outputting the auxiliary output power and after the robot control system 112 is powered on and initialized, the power supply 110 and the robot control system 112 may automatically pair by communicating via the auxiliary power connection. To perform the pairing, the power supply 110 detects, via the communications circuitry 218, that the robot control system is coupled to the auxiliary power connection. For example, the communications circuitry 218 (and/or the communications circuitry 242) outputs messages via the auxiliary power connection, which are received and/or acknowledged by the communications circuitry 242 (or the communications circuitry 218).

In response to detecting the robot control system 112 via the auxiliary power connection and receiving communications from the robot control system 112, the controller 212 configures the welding-type power supply 110. For example, upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

Figure 5:
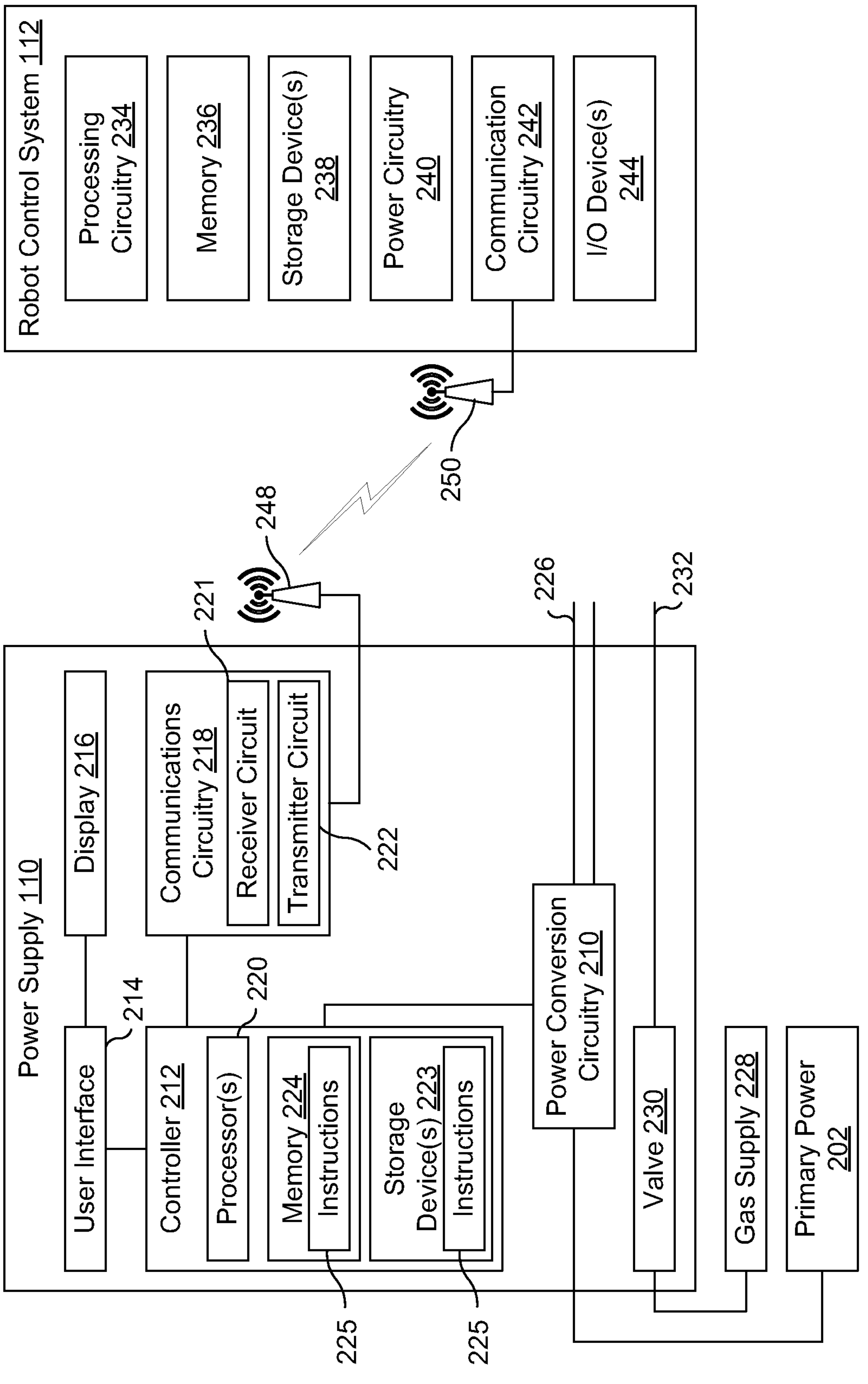
FIG. 5 is a block diagram of another example implementation of the welding-type power supply and the robot control system of FIGS. 1A-3A.

FIG. 5 is a block diagram of another example implementation of the welding-type power supply 110 and the robot control system 112 of FIG. 1A. The example power supply 110 of FIG. 5 includes the components of the example power supply 110 of FIG. 4, but may include or omit the auxiliary power output circuitry 246. The example robot control system 112 of FIG. 5 includes the components of the robot control system 112 of FIG. 4.

In contrast with the power line communication of FIG. 4, the example welding-type power supply 110 and the robot control system 112 of FIG. 5 communicate via wireless communications. To this end, the example communications circuitry 218 and communications circuitry 242 are connected to respective antennas 248, 250.

While establishment of communications may occur automatically using power line communications as in FIG. 4, the example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby).

While example powerline and wireless communications are disclosed above, the example robot control system 112 and the power supply 110 may be coupled using any communications method, including conventional methods such as a control cable.

Figure 6:
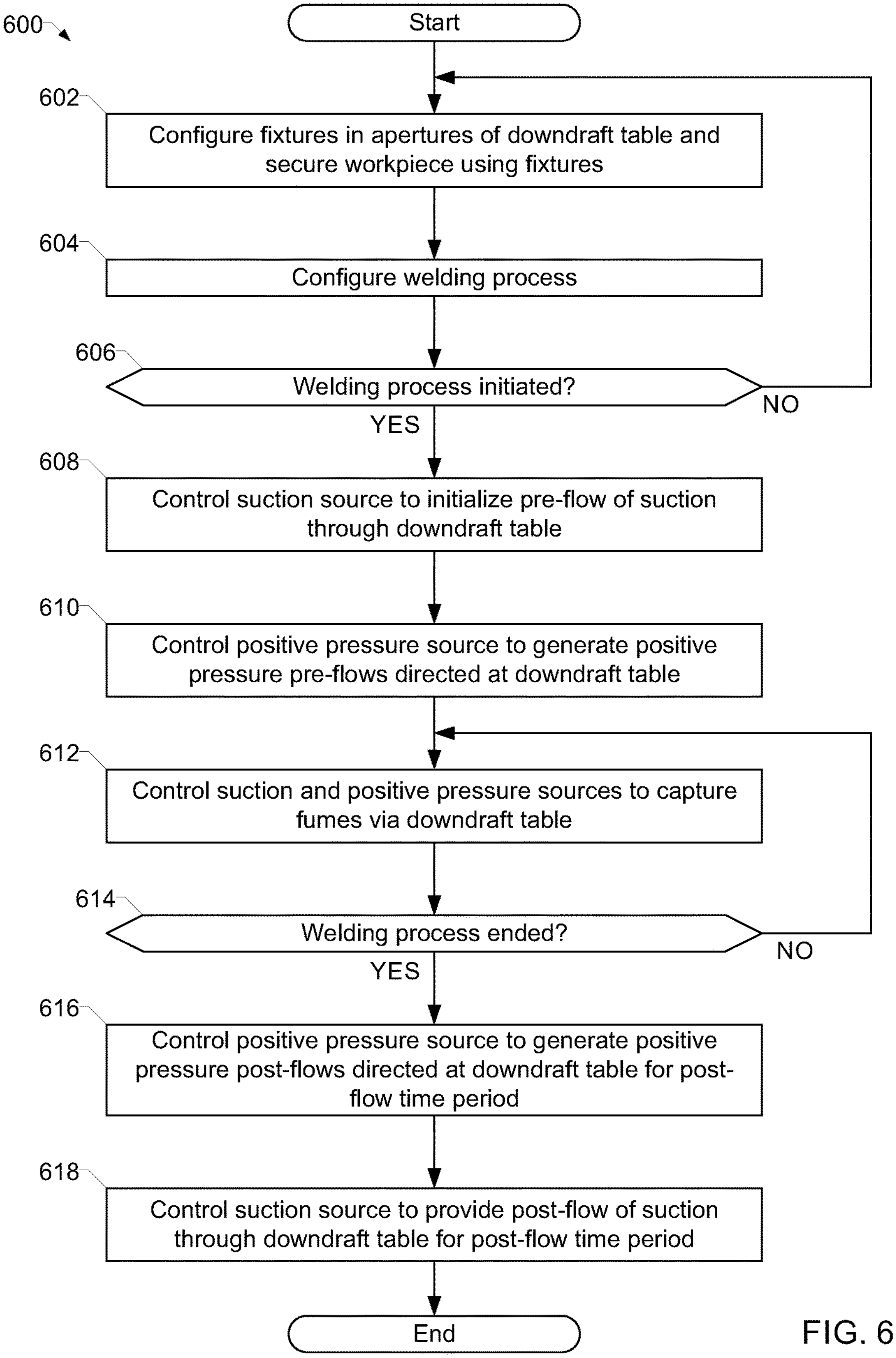
FIG. 6 is a flowchart representative of an example method to capture welding fumes, in accordance with aspects of this disclosure.

FIG. 6 is a flowchart representative of an example method 600 to capture welding fumes. The example method 300 may be performed using any of the example systems 100, 160, 170, 200, 300 of FIGS. 1A-3A, 4, and/or 5. The example method 600 is described below with reference to the example system 100 of FIG. 1A. However, the method 600 may be used with any of the example systems 100, 160, 170, 400, 500, and/or with either manual or automated welding.

At block 602, an operator configures the fixtures 116 using the apertures 154 of the downdraft table 102, and secures a workpiece 114 using the fixtures 116. The operator may be a robotic welding supervisor or technician, or a weld operator performing manual welding.

At block 604, the welding process is configured. For example, an operator may configure parameters on the welding-type power supply 110, or teach a robotic welding path and configure welding parameters via the robot control system 112.

At block 606, a control system (e.g., the robot control system 112, the welding-type power supply 110, an external control system, etc.) determines whether a welding process is initiated. For example, the robot control system 112 may transmit an initiation signal or a welding torch trigger may be detected via the robot control system 112, the welding-type power supply 110, and/or another sensor. If a welding process has not been initiated (block 606), control returns to block 602 or block 604 to continue configuring the welding procedure and/or workpiece.

When a welding process is initiated (block 606), at block 608 the control system (e.g., the robot control system 112) controls the suction source 150 to initialize a pre-flow of suction through the downdraft table 102. The pre-flow may be configured to establish a steady flow of air through the downdraft table 102 prior to production of fumes, to reduce the emission of fumes into the surrounding environment. At block 610, the robot control system 112 controls the positive pressure source 104 to generate one or more positive pressure pre-flows directed towards the downdraft table 102. Blocks 608 and 610 may be separated in time in any order, or performed simultaneously, to achieve the desired airflow prior to the production of fumes via the welding operation.

At block 612, the robot control system 112 controls the suction source 150 and the positive pressure source 104 to capture fumes via the downdraft table 102.

At block 614, the robot control system 112 determines whether the welding process has ended. For example, the robot control system 112 may determine whether a process ending instruction has been executed or issued, or if a welding current measured via a current sensor has dropped below a threshold current for at least a threshold time period, indicating the end of an arc welding operation. If the welding process has not ended (block 614), control returns to block 612 to continue capturing fumes.

When the welding process has ended (block 614), at block 616 the robot control system 112 controls the positive pressure source 104 to generate positive pressure post-flows directed at the downdraft table 102 for a post-flow time period. At block 618 the robot control system 112 also controls the suction source 150 to provide a post-flow of suction through the downdraft table 102 for a post-flow time period. Blocks 616 and 618 may be separated in time in any order, or performed simultaneously, to capture fumes remaining after production of fumes has ended. The example method 600 then ends.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:

a downdraft table comprising:

a work surface; and a suction source configured to create a negative pressure through at least one of the work surface or a second surface adjacent to the work surface; and a positive pressure source configured to direct a positive pressure airflow into the ambient environment along at least a portion of a periphery of the downdraft table and not toward the work surface, wherein the downdraft table is configured to draw air in from the ambient environment.

2. The welding system as defined in claim 1, wherein the work surface comprises a plurality of apertures, and the downdraft table is configured to direct fumes generated adjacent the work surface through the work surface to the suction source via the apertures.

3. The welding system as defined in claim 1, further comprising one or more fixtures configured to be mounted or attached to the work surface via the apertures, the fixtures configured to hold a workpiece in place on the work surface.

4. The welding system as defined in claim 1, wherein the positive pressure source comprises a manifold configured to create at least one of an air knife or an air curtain positioned to block dispersion of fumes generated adjacent the work surface in at least one direction away from the downdraft table.

5. The welding system as defined in claim 4, wherein the manifold is configured to create two or more air curtains or air curtains on two more sides of the downdraft table.

6. The welding system as defined in claim 4, wherein the suction source is configured to draw air and fume via the at least one of the work surface or the second surface, filter the fume from the air, and expel filtered air via the manifold.

7. A welding system, comprising:

a downdraft table comprising:

a work surface; and a suction source configured to create a negative pressure through at least one of the work surface or a second surface adjacent to the work surface; and a positive pressure source configured to direct a positive pressure airflow into the ambient environment along at least a portion of a periphery of the downdraft table, wherein the downdraft table is configured to draw air in from the ambient environment, wherein the positive pressure source is positioned above the downdraft table and configured to create the positive pressure airflow in a cone shape along the periphery of the work surface.

8. The welding system as defined in claim 1, further comprising a robotic manipulator coupled to the downdraft table and configured to manipulate a welding torch.

9. The welding system as defined in claim 8, further comprising a welding-type power supply configured to supply welding-type power to the welding torch.

10. The welding system as defined in claim 9, further comprising a robotic controller configured to control the robotic manipulator and the welding-type power supply to perform a robotic welding procedure on a workpiece positioned on the downdraft table.

11. The welding system as defined in claim 10, wherein the robotic controller is configured to control the suction source.

12. The welding system as defined in claim 1, wherein the positive pressure source is configured to entrain fumes generated adjacent the work surface between the positive pressure airflow and the work surface such that the fumes are drawn into the suction source.

13. The welding system as defined in claim 1, wherein the second surface comprises a lateral surface, and the downdraft table is configured to direct fumes generated adjacent the work surface through the lateral surface to the suction source.

* * * * *